(12) United States Patent  
Li et al.

(10) Patent No.: US 8,330,903 B2
(45) Date of Patent: Dec. 11, 2012

(54) LIQUID CRYSTAL DISPLAY AND SUBSTRATE THEREOF

(75) Inventors: Yuhua Li, Beijing (CN); Kun Cao, Beijing (CN)

(73) Assignee: Beijing Boe Optoelectronics Technology Co., Ltd., Beijing (CN)

( * ) Notice: Subject to any disclaimer, the term of this patent is extended or adjusted under 35 U.S.C. 154(b) by 63 days.

(21) Appl. No.: 12/872,405

(22) Filed: Aug. 31, 2010

(65) Prior Publication Data

US 2011/0051056 A1   Mar. 3, 2011

(30) Foreign Application Priority Data

Sep. 2, 2009 (CN) .......................... 2009 1 0092129

(51) Int. Cl.
*G02F 1/1335* (2006.01)
(52) U.S. Cl. ......... 349/106; 349/104; 349/158; 349/160
(58) Field of Classification Search .................. 349/104, 349/106, 123, 124, 129, 158, 160
See application file for complete search history.

(56) References Cited

U.S. PATENT DOCUMENTS

| 5,771,085 | A  | * | 6/1998 | Ochi et al. ..................... 349/158 |
| 6,348,958 | B1 | * | 2/2002 | Matsuoka et al. ............. 349/106 |
| 2003/0067569 | A1 | * | 4/2003 | Chang et al. .................. 349/106 |
| 2003/0173033 | A1 |   | 9/2003 | Lee et al. |
| 2011/0051056 | A1 | * | 3/2011 | Li et al. ......................... 349/106 |

FOREIGN PATENT DOCUMENTS

| CN | 1447167 A | 10/2003 |
| CN | 1963679 A | 5/2007 |
| CN | 1987581 A | 6/2007 |

* cited by examiner

*Primary Examiner* — Brian Healy
(74) *Attorney, Agent, or Firm* — Ladas & Parry LLP (57) ABSTRACT

A liquid crystal display, comprising an array substrate and a color filter substrate, wherein a combination type mark is disposed on both of the array substrate and the color filter substrate, and the combination type mark comprises a rough mark and a fine mark that is located around the rough mark; and wherein the rough mark on the array substrate corresponds to the rough mark on the color filter substrate, and the fine mark on the array substrate corresponds to the fine mark on the color filter substrate.

18 Claims, 6 Drawing Sheets

LIQUID CRYSTAL DISPLAY AND SUBSTRATE THEREOF

BACKGROUND

Embodiments of the present invention pertain to manufacturing of a liquid crystal display (LCD).

With rapid progress of technology, liquid crystal displays have been widely used in people's life, for example, applied to television sets, computers, mobile phones and various modern office appliances and the like.

Manufacturing of a liquid crystal display generally involves identification, reading and alignment of alignment marks (referred to as "mark" hereinafter) and so on. Also in microelectronics/semiconductor manufacturing processes, identification, reading and alignment of marks are particularly important for the precision of the processes.

In general, when a panel is formed, marks are disposed on a gate layer. When a liquid crystal display panel is manufactured, an array pattern is formed on a glass substrate, and the array pattern is usually performed with the micron level identification.

In order to ensure the formation of micron-sized and even smaller patterns in these manufacturing processes, it is necessary for marks to be identified, read and aligned accurately.

In general, these processes are completed by two separate identifications steps for rough alignment and fine alignment, respectively, which increases the time required for performing the manufacturing processes.

SUMMARY

One embodiment of the present invention provides a liquid crystal display panel, comprising an array substrate and a color filter substrate. A combination type mark disposed on each of the array substrate and the color filter substrate, and the combination type mark comprising a rough mark and a fine mark, and the fine mark located around the rough mark; the rough mark on the array substrate corresponds to the rough mark on the color filter substrate; and the fine mark on the array substrate corresponds to the fine mark on the color filter substrate.

Another embodiment of the present invention provides a substrate, and a combination type mark is disposed on the substrate, and the combination type mark comprises a rough mark and a fine mark and the fine mark is located around the rough mark.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the following detailed description.

BRIEF DESCRIPTION OF THE DRAWINGS

The present invention will become more fully understood from the detailed description given hereinafter and the accompanying drawings which are given by way of illustration only, and thus are not limitative of the present invention and wherein.

DETAILED DESCRIPTION

An embodiment of the present invention provides a liquid crystal display, for which the time required to align an array substrate and a color filter substrate is relatively shorter.

A liquid crystal display according to one embodiment of the present invention comprises an array substrate and a color filter substrate, and a combination type mark is disposed on each of the array substrate and the color filter substrate, and the combination type mark comprises a rough mark and a fine mark that is located around the rough mark; the rough mark on the array substrate corresponds to the rough mark on the color filter substrate; the fine mark on the array substrate corresponds to the fine mark on the color filter substrate.

The liquid crystal display according to the embodiment of the present invention has the combination type mark. The steps for rough alignment and fine alignment can be carried out in a same process, so the separate identification steps for rough alignment and fine alignment in the conventionally technology can be avoided, and the alignment time can be reduced.

Hereinafter, the liquid crystal display of the embodiments of the present invention will be described in detail. Please note that the accompanying drawings are for illustration purpose only and not drawn according to the actual scale; for example, the fine mark signs (bars) in the drawings can have a length much larger than the interval of them.

Embodiment 1

The liquid crystal display of the present embodiment comprises an array substrate and a color filter substrate. A combination type mark is disposed on each of the array substrate and the color filter substrate. The combination type mark comprises a rough mark and a fine mark that is located around the rough mark; the rough mark on the array substrate corresponds to the rough mark on the color filter substrate; the fine mark on the array substrate corresponds to the fine mark on the color filter substrate.

Figure 1:
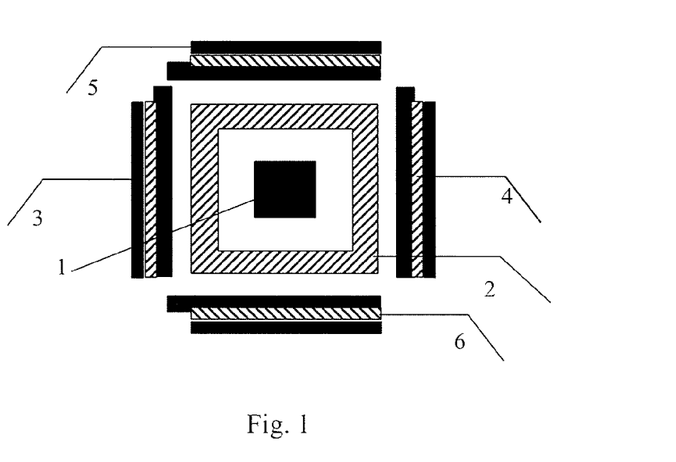
FIG. 1 is a structural schematic view showing marks disposed in a liquid crystal display of embodiment 1 of the present invention.

FIG. 1 is a structural schematic view showing the marks disposed in a liquid crystal display of the present embodiment after the array substrate and the color filter substrate are assembled together. These marks comprise: a rough mark 1 on the array substrate; a rough mark 2 on the color filter substrate; a fine mark 3 in an X direction and a fine mark 5 in a Y direction on a plane of the array substrate; a fine mark 4 in the X direction and a fine mark 6 in the Y direction on a plane of the color filter substrate.

In FIG. 1, the rest of the black fine marks not denoted with reference number are the fine marks on the array substrate, and the rest of the oblique line fine marks not denoted with reference number are the fine marks on the color filter substrate.

For convenience and simplicity, only a part of the all fine marks are showed in the drawing.

In the present embodiment, the rough mark 1 may be of a square shape; and the rough mark 2 may be in a square ring shape.

When the array substrate is aligned with the color filter substrate, the rough alignment is performed by using the rough mark 1 and the rough mark 2, with a result that the rough mark 1 is placed at the center of the ring of the rough mark 2, and then the fine alignment is performed by using the fine marks.

In the present embodiment, the fine mark is designed as follows.

Figure 2:
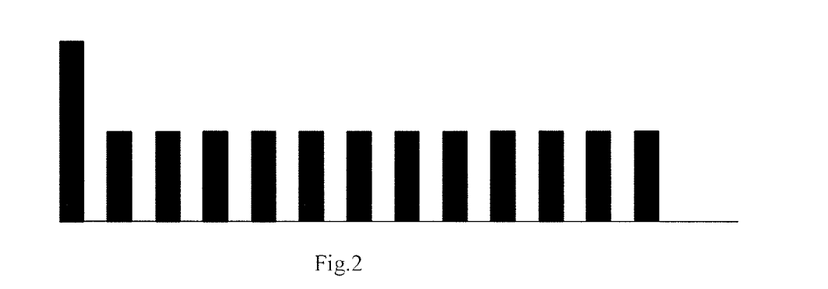
FIG. 2 is a structural schematic view showing a fine mark on an array substrate of the liquid crystal display in embodiment 1 of the present invention.

The fine mark on the array substrate comprises 13 fine mark signs of a rectangle shape, wherein the leftmost fine mark sign is a preceding mark sign, and the preceding mark sign has a length longer than that of the rest mark signs on the array substrate and the lengths of the rest mark signs on the array substrate are equal to each other (as shown in FIG. 2).

Figure 3:
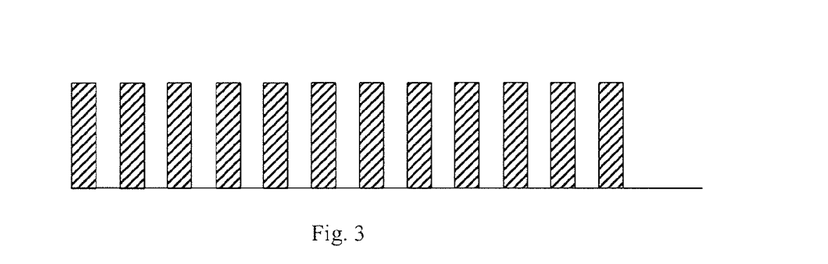
FIG. 3 is a structural schematic view showing a fine mark on a color filter substrate of the liquid crystal display in embodiment 1 of the present invention.

The fine mark disposed on the color filter substrate comprises 12 fine mark signs of a rectangle shape having the same length (as shown in FIG. 3).

The bottom ends of the fine mark signs on array substrate are located in a same straight line, and the bottom end of the fine mark signs on the color filter substrate are located in a same straight line too.

The shape and the size of a gap between the fine mark signs of the fine mark on the array substrate corresponds to the shape and the size of the fine mark signs of the fine mark on the color filter substrate, respectively.

The shape and the size of a gap between the fine mark signs of the fine mark on the color filter substrate corresponds to the shape and the size of the fine mark signs of the fine mark on the array substrate, respectively.

In the present embodiment, intervals between the fine mark signs of the fine mark on the array substrate are equal to each other; the widths of the fine mark signs of the fine mark on the array substrate are equal to each other; and the intervals between the fine mark signs of the fine mark on the array substrate are equal to the widths of the fine mark signs.

During a process for aligning the fine mark disposed on the array substrate with the fine mark disposed on the color filter substrate, if the alignment is accurate, a full-black pattern of a rectangle shape appears without any light transmissive region. However, if the alignment is not accurate, a light transmissive region appears, and it is possible to easily determine a shift or inclination state of the array substrate or the color filter substrate, and based on the shift or inclination state, the aligning process can be adjusted until the full-black pattern appears, and thus, the alignment precision of the array substrate and the color filter substrate can be improved.

Figure 4:
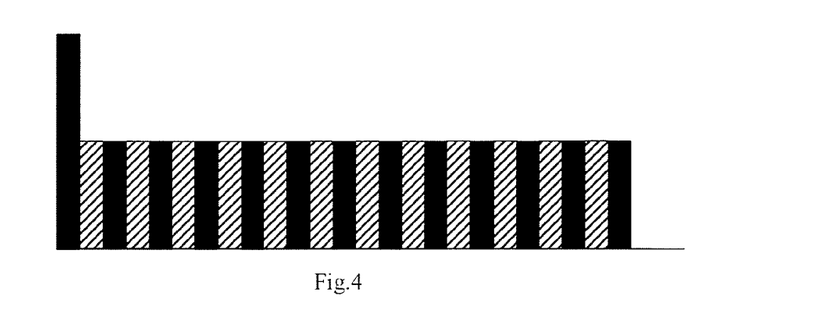
FIG. 4 is a structural schematic view showing the excellent combination between the fine mark on the array substrate and the fine mark on the color filter substrate in embodiment 1.

The specific alignment and adjustment methods are as follows:

(1) when a process for assembling together the array substrate and the color filter substrate is performed, and in the case where a fine mark is disposed on the array substrate (as shown in FIG. 2) and a corresponding fine mark is disposed on the color filter substrate (as shown in FIG. 3), after a process for aligning the fine mark on the array substrate (as shown in FIG. 2) with the fine mark on the color filter substrate (as shown in FIG. 3), a pattern as shown in FIG. 4 is generated, that is, the fine marks after alignment do not give rise to any light transmissive region therebetween, which indicates that the fine mark on the array substrate (as shown in FIG. 2) and the fine mark on the color filter substrate (as shown in FIG. 3) are tightly combined, and the alignment of the fine mark is excellent and meets the design requirements.

Figure 5:
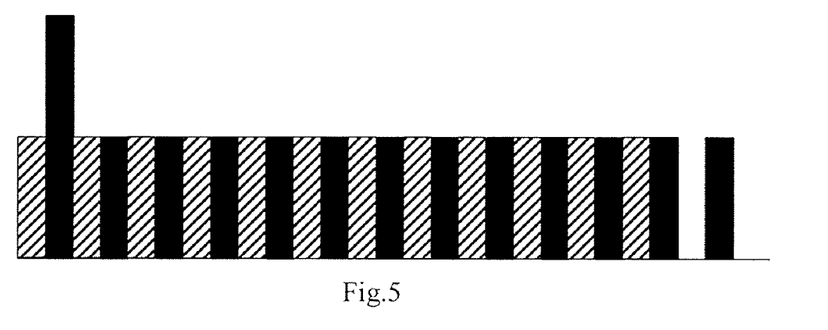
FIG. 5 is a structural schematic view showing poor combination 1 between the fine mark on the array substrate and the fine mark on the color filter substrate in embodiment 1.

(2) when a process for assembling together the array substrate and the color filter substrate is performed, and in the case where a fine mark is disposed on the array substrate (as shown in FIG. 2) and a corresponding fine mark is disposed on the color filter substrate (as shown in FIG. 3), after a process for aligning the fine mark on the array substrate (as shown in FIG. 2) with the fine mark on the color filter substrate (as shown in FIG. 3), a pattern as shown in FIG. 5 is generated, that is, a light transmissive region appears in the fine mark after the aligning process, and the fine mark on the array substrate is rightward shifted by two times of the width of the mark sign or the fine mark on the color filter substrate is leftward shifted by two times of the width of the mark sign, which indicates that during the aligning process of the fine mark on the array substrate (as shown in FIG. 2) and the fine mark on the color filter substrate (as shown in FIG. 3), the array substrate is rightward shifted by two times of the width of the mark sign or the color filter substrate is leftward shifted by two times of the width of the mark sign. At this time, the array substrate may be adjusted to move leftward by two times of the width of the mark sign or the color filter substrate may be adjusted to move rightward by two times of the width of the mark sign until the full-black pattern of a rectangle shape appears after the aligning process.

Figure 6:
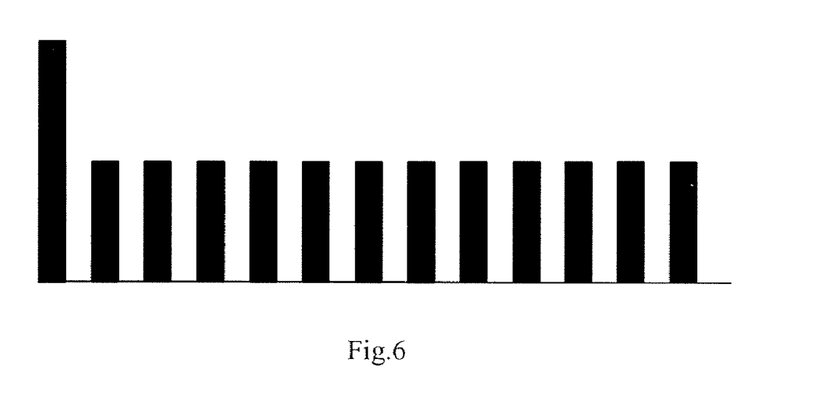
FIG. 6 is a structural schematic view showing poor combination 2 between the fine mark on the array substrate and the fine mark on the color filter substrate in embodiment 1.

(3) when a process for assembling together the array substrate and the color filter substrate is performed, and in the case where a fine mark is disposed on the array substrate (as shown in FIG. 2) and a corresponding fine mark is disposed on the color filter substrate (as shown in FIG. 3), after a process for aligning the fine mark on the array substrate (as shown in FIG. 2) with the fine mark on the color filter substrate (as shown in FIG. 3), a pattern as shown in FIG. 6 is generated, that is, a light transmissive region appears in the fine mark after the aligning process, and the fine mark on the array substrate is rightward shifted by the width of the mark sign or the fine mark on the color filter substrate is leftward shifted by the width of the mark sign, which indicates that during the aligning process of the fine mark on the array substrate (as shown in FIG. 2) and the fine mark on the color filter substrate (as shown in FIG. 3), the array substrate is rightward shifted by the width of the mark sign or the color filter substrate is leftward shifted by the width of the mark sign. At this time, the array substrate may be adjusted to move leftward by the width of the mark sign or the color filter substrate may be adjusted to move rightward by the width of the mark sign until the complete-black pattern of a rectangle shape appears after the aligning process.

Figure 7:
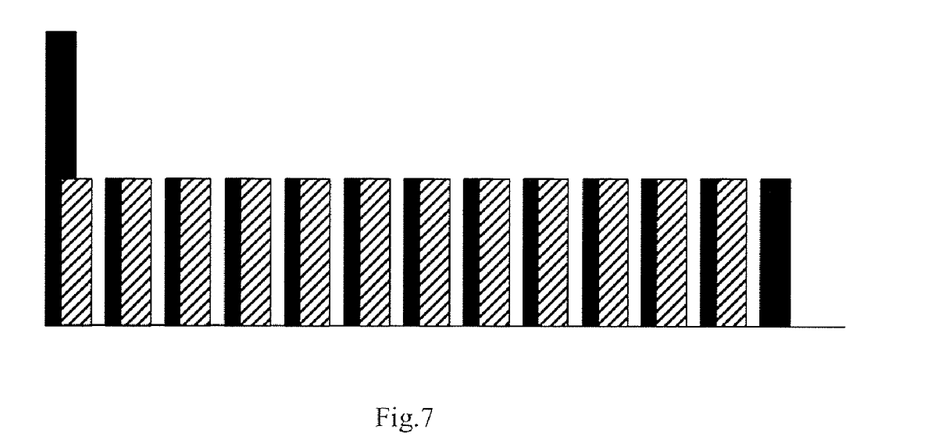
FIG. 7 is a structural schematic view showing poor combination 3 between the fine mark on the array substrate and the fine mark on the color filter substrate in embodiment 1.

(4) when a process for assembling together the array substrate and the color filter substrate is performed, and in the case where a fine mark is disposed on the array substrate (as shown in FIG. 2) and a corresponding fine mark is disposed on the color filter substrate (as shown in FIG. 3), after a process for aligning the fine mark on the array substrate (as shown in FIG. 2) with the fine mark on the color filter substrate (as shown in FIG. 3), a pattern as shown in FIG. 7 is generated, that is, a light transmissive region appears in the fine mark after the aligning process, and the fine mark on the array substrate is rightward shifted by half the width of the mark sign or the fine mark on the color filter substrate is leftward shifted by half the width of the mark sign, which indicates that during the aligning process of the fine mark on the array substrate (as shown in FIG. 2) and the fine mark on the color filter substrate (as shown in FIG. 3), the array substrate is rightward shifted by half the width of the mark sign or the color filter substrate is leftward shifted by half the width of the mark sign. At this time, the array substrate may be adjusted to move leftward by half the width of the mark sign or the color filter substrate may be adjusted to move rightward by half the width of the mark sign until the full-black pattern of a rectangle shape appears after the aligning process.

Figure 8:
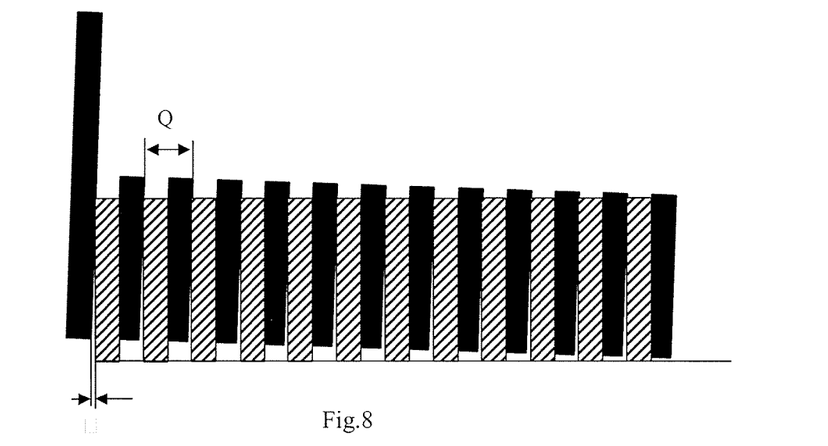
FIG. 8 is a structural schematic view showing poor combination 4 between the fine mark on the array substrate and the fine mark on the color filter substrate in embodiment 1.

(5) when a process for assembling together the array substrate and the color filter substrate is performed, and in the case where a fine mark is disposed on the array substrate (as shown in FIG. 2) and a corresponding fine mark is disposed on the color filter substrate (as shown in FIG. 3), after a process for aligning the fine mark on the array substrate (as shown in FIG. 2) with the fine mark on the color filter substrate (as shown in FIG. 3), a pattern as shown in FIG. 8 is generated, that is, a light transmissive region appears in the fine mark after the aligning process, and oblique fringes are formed, and based on the oblique fringes, it can be definitely determined that a misalignment occurs during the process for aligning the fine mark on the array substrate and the fine mark on color filter substrate. The misalignment leads to a misalignment angle $\theta$ (when $\theta$ is 0 radian, the inclination is not generated between the marks) formed between the fine mark on the array substrate (as shown in FIG. 2) and the fine mark on the color filter substrate (as shown in FIG. 3), and when the range of the misalignment angle $\theta$ is from 0.001 radian to 1.000 radian, bright-dark alternating and periodic dark fringes and bright fringes are formed between the fine mark disposed on the array substrate (as shown in FIG. 2) and the fine mark disposed on the color filter substrate (as shown in FIG. 3), and the dark fringes and the bright fringes are formed into overlapped fringes. If the period of the dark fringes is represented by T and the extending direction of the dark fringes is perpendicular to the angular bisector of the angle $\theta$, the relationship between the period T of the dark fringes and a period Q of the marks is: $T=(1/\theta)Q$, and for ease of calculation, the misalignment angle $\theta$ is represented in a radian unit, and T decreases with the increase of Q, and if $\theta=0.1$ radian, $T=10Q$, and the larger T is, more easily the dark fringes can be distinguished. Therefore, the aligning process can be adjusted by controlling $\theta$ until the full-black pattern of a rectangle shape appears after the aligning process.

Figure 9:
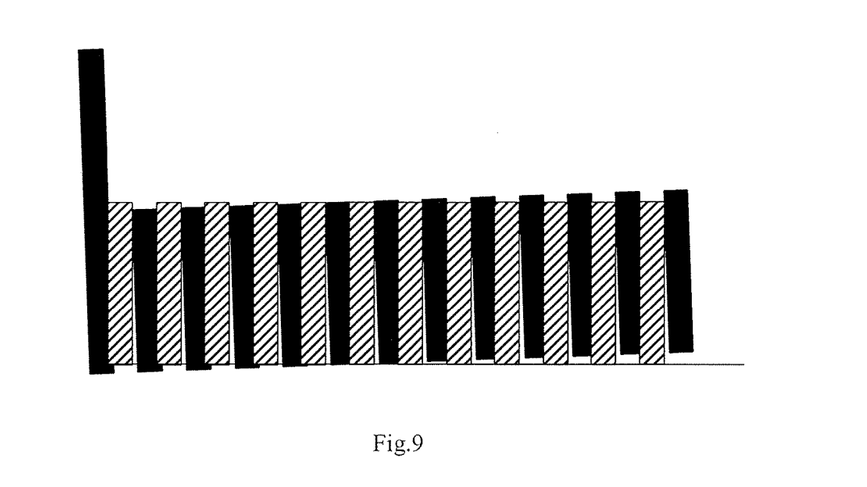
FIG. 9 is a structural schematic view showing poor combination 5 between the fine mark on the array substrate and the fine mark on the color filter substrate in embodiment 1.

(6) when a process for assembling together the array substrate and the color filter substrate is performed, and in the case where a fine mark is disposed on the array substrate (as shown in FIG. 2) and a corresponding fine mark is disposed on the color filter substrate (as shown in FIG. 3), after a process for aligning the fine mark on the array substrate (as shown in FIG. 2) with the fine mark on the color filter substrate (as shown in FIG. 3), a pattern as shown in FIG. 9 is generated, that is, a light transmissive region appears in the fine mark after the aligning process, and oblique fringes are formed, and based on the oblique fringes, it can be definitely determined that a misalignment occurs during the process for aligning the fine mark on the array substrate and the fine mark on color filter substrate. The misalignment leads to a misalignment angle $\theta$ (when $\theta$ is 0 radian, the inclination is not generated between the marks) formed between the fine mark on the array substrate (as shown in FIG. 2) and the fine mark on the color filter substrate (as shown in FIG. 3), and the inclination direction is opposite to that of (5). The specific analysis is similar to that described in situation (5).

Embodiment 2

In the present embodiment, the structure of the liquid crystal display is substantially the same as that of the liquid crystal display in embodiment 1. The difference lies in the design of the fine marks.

In the present embodiment, the design of the fine mark is as follows.

The fine mark disposed on an array substrate comprises one preceding mark sign of a rectangle shape and seven reverse L-shaped fine mark signs. The preceding mark sign is at the leftmost side of the fine mark and has a length larger than that of the rest mark signs, and the rest mark signs have an equal length (as shown in FIG. 10).

The fine mark disposed on the color filter substrate comprises one rectangle shaped preceding mark sign and seven L-shaped fine mark signs. The preceding mark sign is at the rightmost side of the fine marks and has a length larger than that of the rest mark signs, and the rest mark signs have an equal length (as shown in FIG. 11).

The bottom ends of the fine mark signs on the array substrate are located in a same straight line; likewise, the bottom ends of the fine mark signs on the color filter substrate are located in a same straight line.

Figure 10:
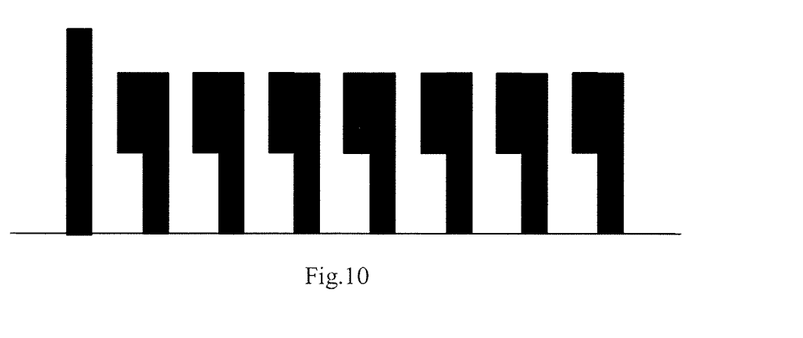
FIG. 10 is a structural schematic view showing a fine mark on an array substrate of a liquid crystal display in embodiment 2 of the present invention.
Figure 11:
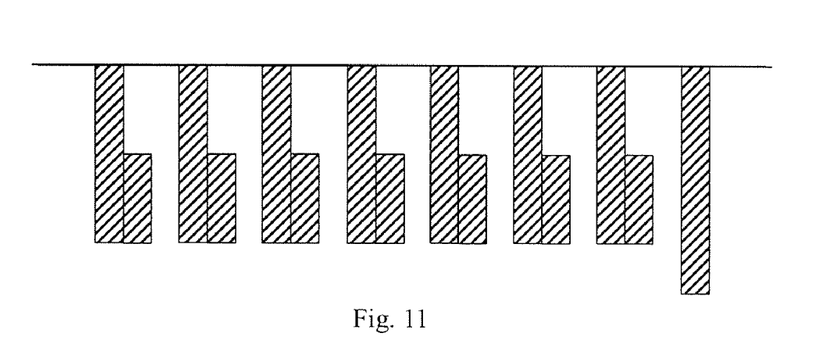
FIG. 11 is a structural schematic view showing a fine mark on a color filter substrate of the liquid crystal display in embodiment 2 of the present invention.
Figure 12:
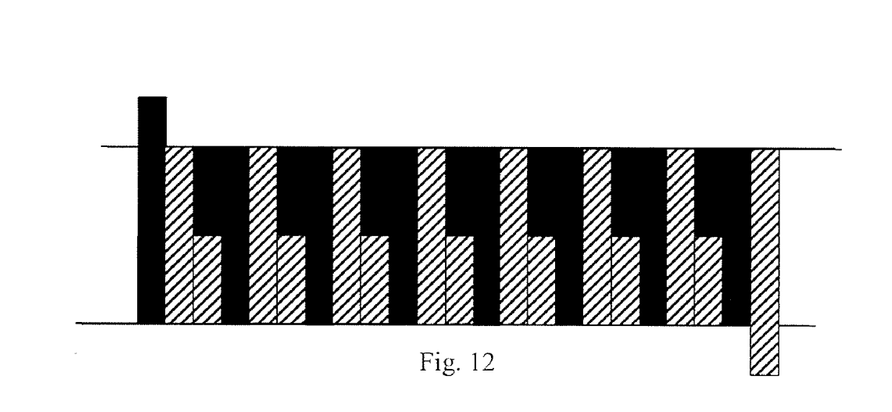
FIG. 12 is a structural schematic view showing the excellent combination between the fine mark on the array substrate and the fine mark on the color filter substrate in embodiment 2.

(1) when a process for assembling together the array substrate and the color filter substrate is performed, and in the case where a fine mark is disposed on the array substrate (as shown in FIG. 10) and a corresponding fine mark is disposed on the color filter substrate (as shown in FIG. 11), after a process for aligning the fine mark on the array substrate (as shown in FIG. 10) with the fine mark on the color filter substrate (as shown in FIG. 11), a pattern as shown in FIG. 12 is generated, that is, the fine marks after alignment do not give rise to any light transmissive region therebetween, and the pattern is a entire black rectangle shaped pattern, which indicates that the fine mark on the array substrate (as shown in FIG. 10) and the fine mark on the color filter substrate (as shown in FIG. 11) are tightly combined, and the alignment of the fine mark is excellent and meets the design requirements.

Figure 13:
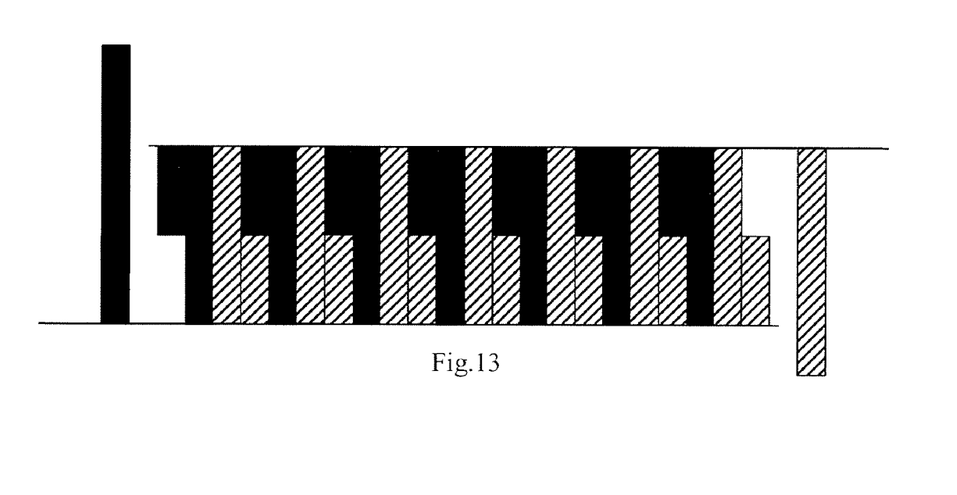
FIG. 13 is a structural schematic view showing poor combination 1 between the fine mark on the array substrate and the fine mark on the color filter substrate in embodiment 2.

(2) when a process for assembling together the array substrate and the color filter substrate is performed, and in the case where a fine mark is disposed on the array substrate (as shown in FIG. 10) and a corresponding fine mark is disposed on the color filter substrate (as shown in FIG. 11), after a process for aligning the fine mark on the array substrate (as shown in FIG. 10) with the fine mark on the color filter substrate (as shown in FIG. 11), a pattern as shown in FIG. 13 is generated, that is, the pattern after the aligning process is an incomplete black rectangle shaped pattern, and a light transmissive region occurs on the both sides, and the fine mark on the array substrate are leftward shifted by one mark sign or the fine mark on the color filter substrate is rightward shifted by one mark sign, which indicates that during the aligning process of the fine mark on the array substrate (as shown in FIG. 10) and the fine mark on the color filter substrate (as shown in FIG. 11), the array substrate is rightward shifted by one mark sign or the color filter substrate is leftward shifted by one mark sign. At this time, the array substrate may be adjusted to move rightward by one mark sign or the color filter substrate may be adjusted to move leftward by one mark sign.

Figure 14:
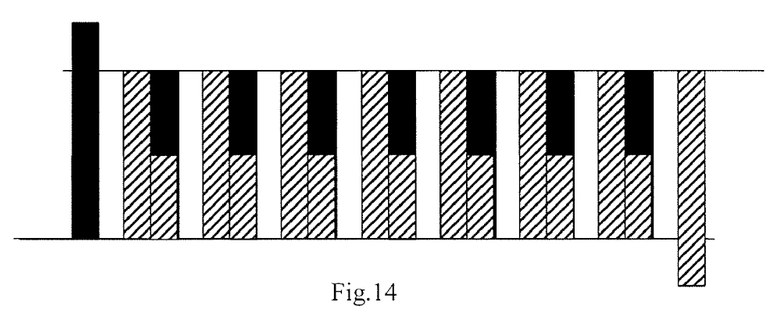
FIG. 14 is a structural schematic view showing poor combination 2 between the fine mark on the array substrate and the fine mark on the color filter substrate in embodiment 2.

(3) when a process for assembling together the array substrate and the color filter substrate is performed, and in the case where a fine mark is disposed on the array substrate (as shown in FIG. 10) and a corresponding fine mark is disposed on the color filter substrate (as shown in FIG. 11), after a process for aligning the fine mark on the array substrate (as shown in FIG. 10) with the fine mark on the color filter substrate (as shown in FIG. 11), a pattern as shown in FIG. 14 is generated, that is, the pattern after the aligning process is an incomplete black rectangle shaped pattern, and a light transmissive region appears, and the fine mark on the array substrate are leftward shifted by half a mark sign or the fine mark on the color filter substrate are rightward shifted by half a mark sign, which indicates that during the aligning process of the fine mark on the array substrate (as shown in FIG. 10) and the fine mark on the color filter substrate (as shown in FIG. 11), the array substrate is leftward shifted by half a mark sign or the color filter substrate is rightward shifted by half a mark sign. At this time, the array substrate may be adjusted to move rightward by half a mark sign or the color filter substrate may be adjusted to move leftward by half a mark sign.

Figure 15:
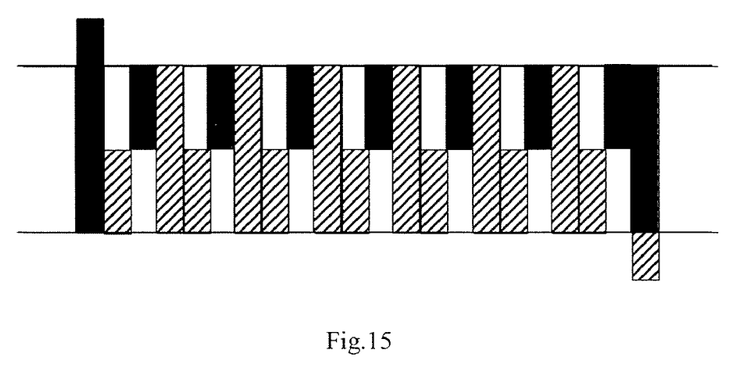
FIG. 15 is a structural schematic view showing poor combination 3 between the fine mark on the array substrate and the fine mark on the color filter substrate in embodiment 2.

(4) when a process for assembling together the array substrate and the color filter substrate is performed, and in the case where a fine mark is disposed on the array substrate (as shown in FIG. 10) and a corresponding fine mark is disposed on the color filter substrate (as shown in FIG. 11), after a process for aligning the fine mark on the array substrate (as shown in FIG. 10) with the fine mark on the color filter substrate (as shown in FIG. 11), a pattern as shown in FIG. 15 is generated, that is, the pattern after the aligning process is an incomplete black rectangle shaped pattern, and a light transmissive region appears, and the fine mark on the array substrate is rightward shifted by half a mark sign or the fine mark on the color filter substrate are leftward shifted by half a mark sign, which indicates that during the aligning process of the fine mark on the array substrate (as shown in FIG. 10) and the fine mark on the color filter substrate (as shown in FIG. 11), the array substrate is rightward shifted by half a mark sign or the color filter substrate is leftward shifted by half a mark sign. At this time, the color filter substrate may be adjusted to move rightward by half a mark sign or the array substrate may be adjusted to move leftward by half a mark sign.

Figure 16:
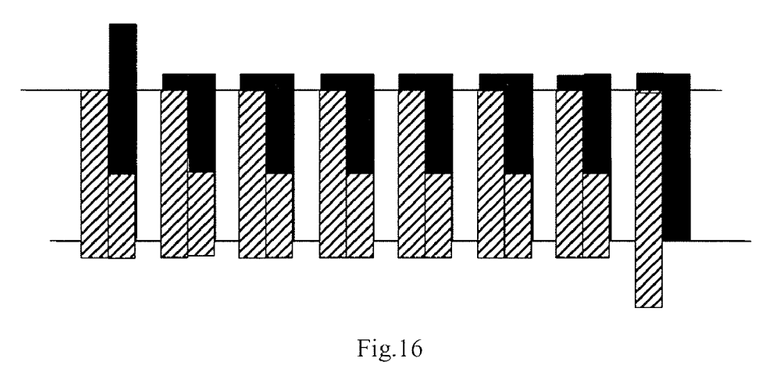
FIG. 16 is a structural schematic view showing poor combination 4 between the fine mark on the array substrate and the fine mark on the color filter substrate in embodiment 2.

(5) when a process for assembling together the array substrate and the color filter substrate is performed, and in the case where a fine mark is disposed on the array substrate (as shown in FIG. 10) and a corresponding fine mark is disposed on the color filter substrate (as shown in FIG. 11), after a process for aligning the fine mark on the array substrate (as shown in FIG. 10) with the fine mark on color filter substrate (as shown in FIG. 11), a pattern as shown in FIG. 16 is generated, that is, the pattern after the aligning process is an incomplete black rectangle shaped pattern, and a light transmissive region appears, and the fine mark on the array substrate is rightward shifted by one mark sign or the fine mark on the color filter substrate is leftward shifted by one mark sign, which indicates that during the aligning process of the fine mark on the array substrate (as shown in FIG. 10) and the fine mark on the color filter substrate (as shown in FIG. 11), the array substrate is rightward shifted by one mark sign or the color filter substrate is leftward shifted by one mark sign. At this time, the color filter substrate may be adjusted to move rightward by one mark sign or the array substrate may be adjusted to move leftward by one mark sign.

Figure 17:
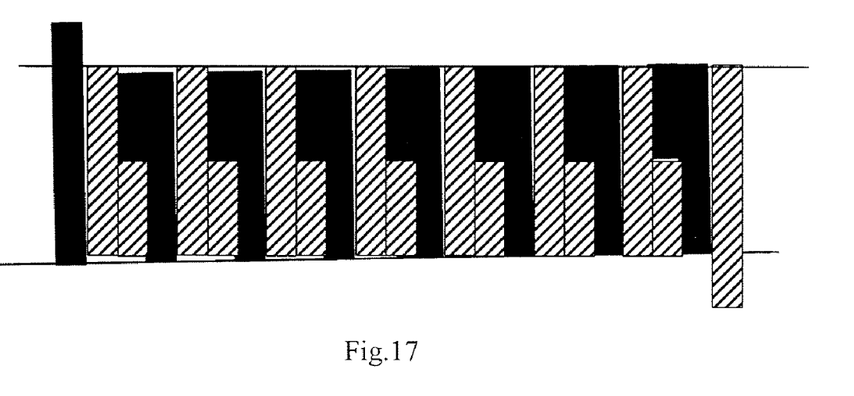
FIG. 17 is a structural schematic view showing poor combination 5 between the fine mark on the array substrate and the fine mark on the color filter substrate in embodiment 2.

(6) when a process for assembling together the array substrate and the color filter substrate is performed, and in the case where a fine mark is disposed on the array substrate (as shown in FIG. 10) and a corresponding fine mark is disposed on the color filter substrate (as shown in FIG. 11), after a process for aligning the fine mark on the array substrate (as shown in FIG. 10) with the fine mark on the color filter substrate (as shown in FIG. 11), a pattern as shown in FIG. 17 is generated, that is, a light transmissive region is generated between the fine marks after the aligning process, and oblique fringes are formed in the transverse and longitudinal directions, and based on the oblique fringes, it can be definitely determined that a misalignment occurs during the process for aligning the fine mark on the array substrate and the fine mark on the color filter substrate. The misalignment leads to a misalignment angle $\theta$ (when $\theta$ is 0 radian, the inclination is not generated between the fine marks) in a clockwise direction formed between the fine mark on the array substrate (as shown in FIG. 10) and the fine mark on the color filter substrate (as shown in FIG. 11), and when the range of the misalignment angle $\theta$ is between 0.001 radian and 1.000 radian, in the transverse and longitudinal directions, bright-dark alternating and periodic dark fringes and bright fringes are formed between the fine mark disposed on the array substrate and the fine mark disposed on the color filter substrate, and the transverse and longitudinal dark fringes and the bright fringes are formed into overlapped fringe (Moiré fringe). If the period of the dark fringes is T and the extending direction of the dark fringes is perpendicular to the angular bisector of the angle $\theta$, the relationship between the period T of the dark fringes and a period Q of the fine mark is: $T=(1/\theta)Q$, and for ease of calculation, the misalignment angle $\theta$ is represented in radian unit, and T decreases with the increase of Q, and if $\theta=0.1$ radian, $T=10Q$, and the larger T is, more easily the dark fringes can be distinguished. Therefore, the aligning process can be adjusted by controlling the $\theta$ and the alignment precision can be improved.

Figure 18:
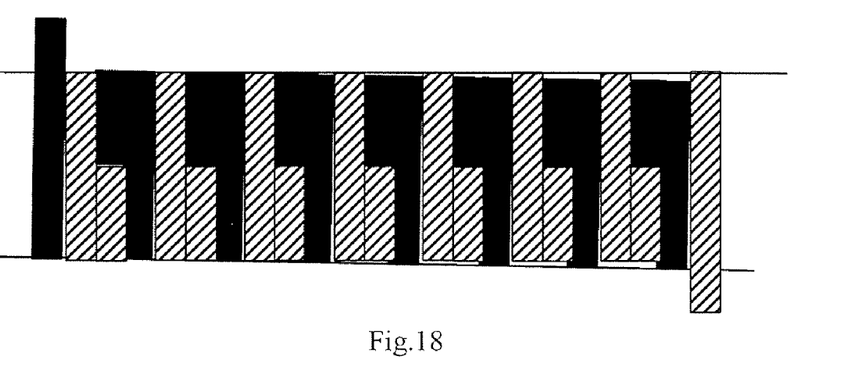
FIG. 18 is a structural schematic view showing poor combination 6 between the fine mark on the array substrate and the fine mark on the color filter substrate in embodiment 2.

(7) when a process for assembling together the array substrate and the color filter substrate is performed, and in the case where a fine mark is disposed on the array substrate (as shown in FIG. 10) and a corresponding fine mark is disposed on the color filter substrate (as shown in FIG. 11), after a process for aligning the fine mark on the array substrate (as shown in FIG. 10) with the fine mark on the color filter substrate (as shown in FIG. 11), a pattern as shown in FIG. 18 is generated, that is, a light transmissive region is generated between the fine marks after the aligning process, and oblique fringes are formed in the transverse and longitudinal directions, and based on the oblique fringes, it can be definitely determined that a misalignment occurs during the process for aligning the fine mark on the array substrate and the fine mark on color filter substrate. The misalignment leads to a misalignment angle θ (when θ is 0, the inclination is not generated between the fine marks) in an anticlockwise direction between the fine mark on the array substrate (as shown in FIG. 10) and the fine mark on color filter substrate (as shown in FIG. 11). The specific analysis is similar to that described in situation (6).

In embodiment 1 and embodiment 2, the intervals between the mark signs of the fine mark on the array substrate may be equal or unequal to each other. The widths of the mark signs of the fine mark on the array substrate may be equal or unequal to each other. The intervals between the mark signs of the fine mark on the array substrate may be equal or unequal to the widths of the mark signs of the fine mark on the array substrate. The width of each fine mark sign may be 0.3 μm~1.0 mm.

An embodiment of the present invention provides a substrate capable of shortening the alignment time.

On the substrate, a combination type mark is provided, and the combination type mark comprises a rough mark and a fine mark, wherein the fine mark is located around the rough mark.

The fine mark comprises: a fine mark in an X direction, a fine mark in a Y direction on a plane of the substrate; the fine marks in the X direction and the Y direction on the plane of the array substrate comprise at least two fine mark signs arranged parallel to each other.

Among the fine mark signs on the array substrate, at least one fine mark sign is a preceding mark sign, and the preceding mark sign is longer than the rest mark signs, and the rest mark signs on the array substrate have an equal length; and/or among the fine mark signs on the color filter substrate, at least one fine mark sign is a preceding mark sign, and the preceding mark sign is longer than the rest mark signs, and the rest mark signs on the color filter substrate have an equal length.

The shape of the fine mark signs on the substrate may be of a rectangle shape, a reverse L shape, a triangle shape, a trapezoid shape or the like.

By aligning the combination type mark, the steps of the rough alignment and the fine alignment can be performed in the same process so as to avoid separately identification steps for the rough alignment and the fine alignment in the conventional technology, and thus, the alignment time can be reduced.

Apparently, the substrate provided with the combination type mark may be applied to television sets, computers, mobile phones and various modern office appliances and the like.

It should be understood by those skilled in the art that various changes and modifications may be made in these embodiments without departing from the scope and spirit of the present invention. If these changes and modifications fall into the range of the claims and their equivalents, the present invention also is directed to include these changes and modifications.

What is claimed is:

1. A liquid crystal display, comprising:
    an array substrate; and
    a color filter substrate,
    wherein a combination type mark is disposed on each of the array substrate and the color filter substrate, and the combination type mark comprises a rough mark and a fine mark that is located around the rough mark,
    the rough mark on the array substrate corresponds to the rough mark on the color filter substrate, and
    the fine mark on the array substrate corresponds to the fine mark on the color filter substrate.

2. The liquid crystal display as claimed in claim 1, wherein the rough mark on the array substrate is in a shape selected from the group consisting of a square ring, a rectangular ring, a elliptical ring and a circular ring; and
    the rough mark on the color filter substrate is in a shape correspondingly selected from the group consisting of a square, a rectangle, a ellipse and a circle, and
    the size of the rough mark on the color filter is smaller than that of a inner ring of the rough mark on the array substrate.

3. The liquid crystal display as claimed in claim 1, wherein the fine mark on the array substrate comprises a fine mark in an X direction and a fine mark in a Y direction on a plane of the array substrate; and the fine mark on the color filter substrate comprises a fine mark in the X direction and a fine mark in the Y direction on a plane of the color filter substrate,
    wherein the fine marks in the X direction and the Y direction on the array substrate comprise at least two fine mark signs arranged parallel to each other; and the fine marks in the X direction and the Y direction on the color filter substrate also comprise at least two fine mark signs arranged parallel to each other;
    a shape and a size of a gap between the fine mark signs of each fine mark on the array substrate corresponds to a shape and a size of the fine mark signs of each fine mark on the color filter substrate, respectively; and
    a shape and a size of a gap between the fine mark signs of each fine mark on the color filter substrate corresponds to a shape and a size of each fine mark signs of the fine mark on the array substrate, respectively.

4. The liquid crystal display as claimed in claim 3, wherein the fine mark signs of each fine mark on the array substrate have a shape selected from the group consisting of a rectangle shape, a reverse L shape, a triangle shape and a trapezoid shape.

5. The liquid crystal display as claimed in claim 3, wherein among the fine mark signs of each fine mark on the array substrate, at least one fine mark sign is a preceding mark sign, and the preceding mark sign is longer than the rest fine mark signs.

6. The liquid crystal display as claimed in claim 5, wherein the rest fine mark signs of each fine mark on the array substrate except the preceding mark sign have an equal length.

7. The liquid crystal display as claimed in claim 3, wherein among the fine mark signs of each fine mark on the color filter substrate, at least one fine mark sign is a preceding mark sign, and the preceding mark sign is longer than the rest fine mark signs.

8. The liquid crystal display as claimed in claim 7, wherein the rest fine mark signs of each fine mark on the color filter substrate except the preceding mark sign have an equal length.

9. The liquid crystal display as claimed in claim 5, wherein among the fine mark signs of each fine mark on the color filter substrate, at least one fine mark sign is a preceding mark sign, and the preceding mark sign is longer than the rest fine mark signs.

10. The liquid crystal display as claimed in claim 9, wherein the rest fine mark signs of each fine mark on the color filter substrate except the preceding mark sign have an equal length.

11. The liquid crystal display as claimed in claim 3, wherein
intervals between the mark signs of each fine mark on the array substrate are equal or unequal to each other.

12. The liquid crystal display as claimed in claim 3, wherein
widths of the mark signs of each fine mark on the array substrate are equal or unequal to each other.

13. The liquid crystal display as claimed in claim 3, wherein
intervals between the mark signs of each fine mark on the array substrate is equal or unequal to widths of the mark signs.

14. The liquid crystal display as claimed in claim 3, wherein widths of the fine mark signs of each fine mark are 0.3 μm~1.0 mm.

15. A substrate, comprising a combination type mark disposed on the substrate, wherein the combination type mark comprises a rough mark and a fine mark that is located around the rough mark, and the fine mark signs of each fine mark on the substrate are in a shape selected from the group consisting of a reverse L shape, a triangle shape and a trapezoid shape.

16. The substrate as claimed in claim 15, wherein the fine mark comprises:
a fine mark in an X direction and a fine mark in a Y direction on a plane of the substrate, and
the fine mark comprise at least two fine mark signs arranged parallel to each other.

17. The substrate as claimed in claim 16, wherein among the fine mark signs of each fine mark on the substrate, at least one fine mark sign is a preceding mark sign, and the preceding mark sign is longer than the rest mark signs.

18. The substrate as claimed in claim 17, wherein
the rest fine mark signs of each fine mark on the substrate except the preceding mark sign have an equal length.

* * * * *